July 29, 1924.
T. BINGHAM
INDICATOR
1,503,345
Filed July 22, 1922     2 Sheets-Sheet 1
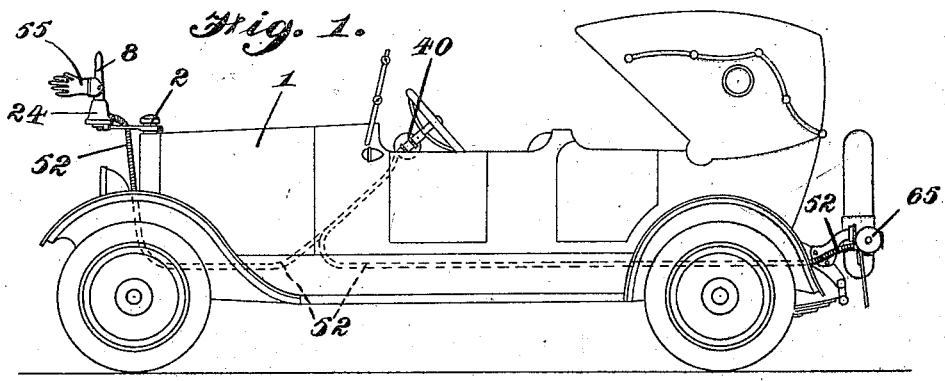
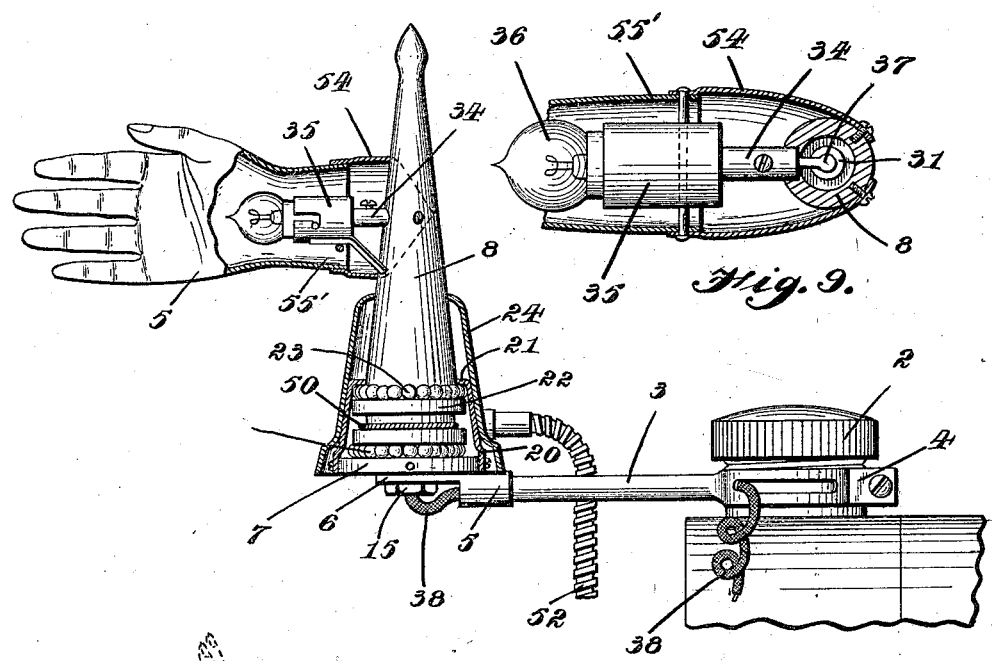
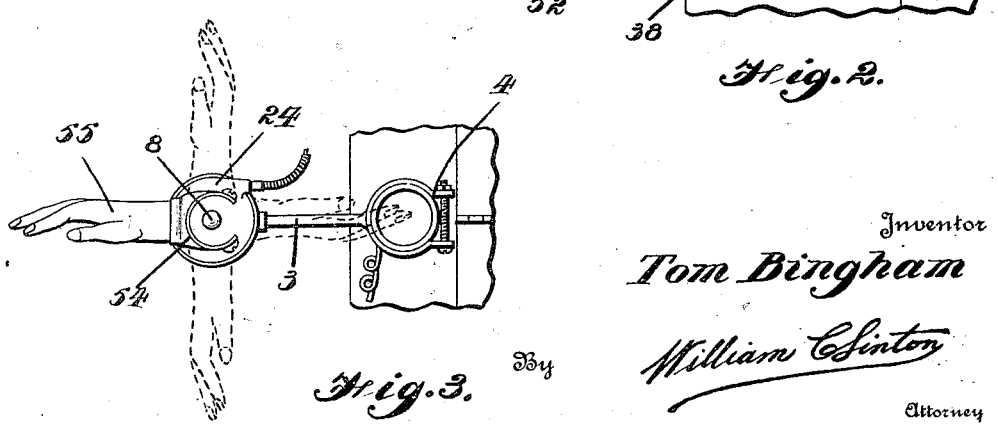
Inventor
Tom Bingham
By William C. Sinton
Attorney

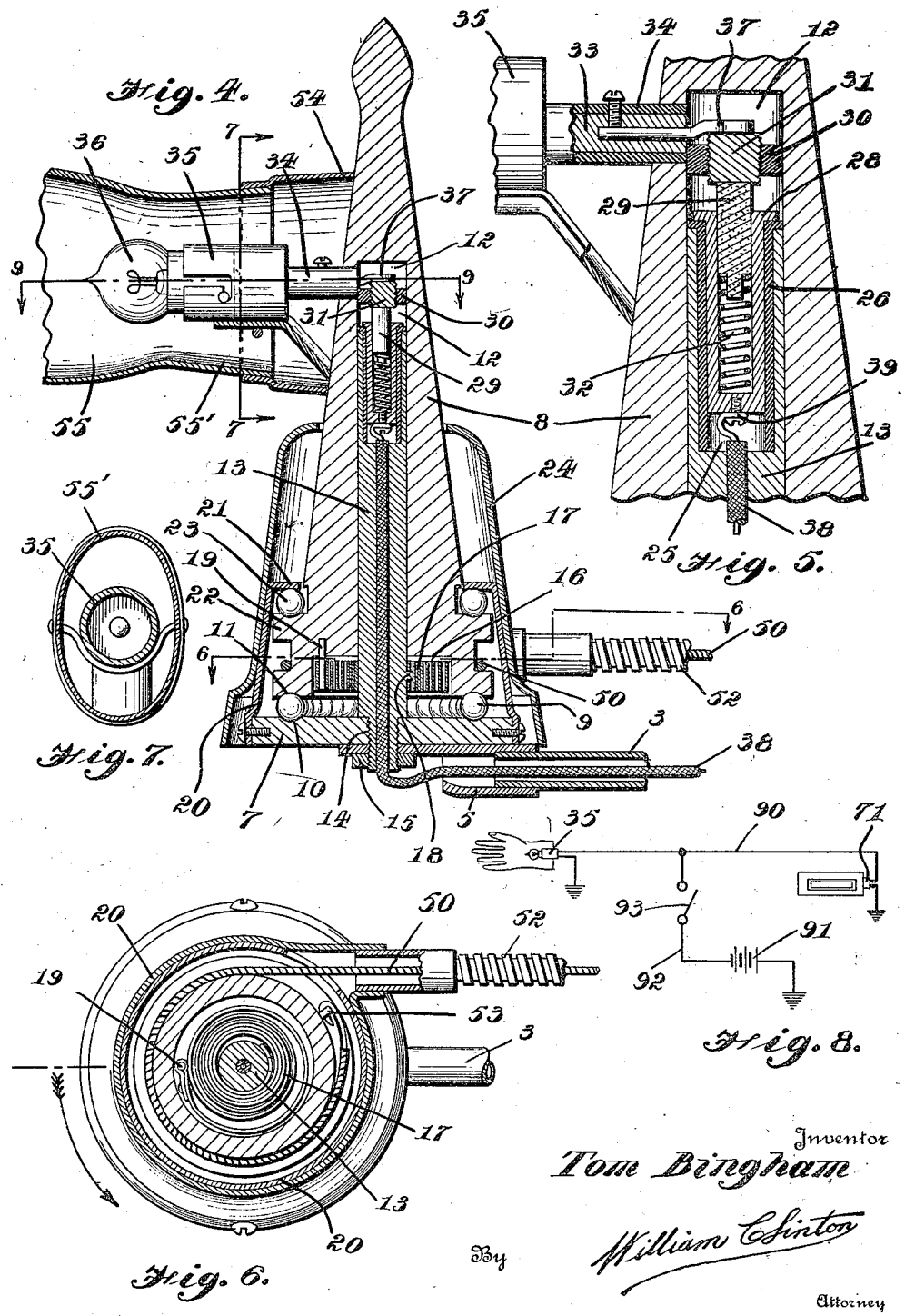

Patented July 29, 1924.

1,503,345

UNITED STATES PATENT OFFICE.

TOM BINGHAM, OF MONTREAL, QUEBEC, CANADA.

INDICATOR.

Application filed July 22, 1922. Serial No. 576,732.

*To all whom it may concern:*

Be it known that I, TOM BINGHAM, a subject of the King of Great Britain, residing at Montreal, Province of Quebec, Canada, have invented certain new and useful Improvements in Indicators; and I do hereby declare that the following is a full, clear, and exact description of the invention, such as will enable others skilled in the art to which it appertains to make and use the same.

The present invention relates to new and useful indicators, designed especially for use in connection with automobiles.

The primary object of the invention is the provision of a pair of electrically illuminated signal devices that are attachable to the forward and rear parts of an automobile and operable simultaneously by a single control device situated within the reach of the driver.

A further object of the invention is the provision of a device of the character indicated, the rear signal of which serves also as the tail light and illuminates the license plate.

Still another feature of the invention resides in a spring like construction whereby the specific position of the indicator is automatically determined upon manipulation of the control. Further objects and advantages of the invention will appear as the description continues, while others will be specifically pointed out.

The invention is fully disclosed in the following description and in the accompanying drawings in which:

Figure 1 is a side elevation of an automobile having the invention applied thereto;

Figure 2 is a side elevation of the forward indicator applied to the radiator cap and partly in section;

Figure 3 is a plan view on Figure 2;

Figure 4 is a vertical section through the forward indicator;

Figure 5 is an enlarged detail view of the contact device of Figure 4;

Figure 6 is a section on the line 6—6 of Figure 4;

Figure 7 is a section on the line 7—7 of Figure 4;

Figure 8 is the wiring diagram; and

Figure 9 is a section on the line 9—9 of Figure 4.

Referring to the various views by corresponding reference characters throughout, and particularly to Figures 1 to 9 inclusive, the radiator cap 2 of the vehicle 1 has attached thereto an arm 3 by means of the clamp device 4. On the outer end of the arm is fitted a tube 5 formed of a flat supporting plate 6. On this supporting plate is fixed a base 7 upon which rests a conical post 8. This post is rotatable with respect to the base, through the medium of ball bearings 9 received therebetween and lying in the grooves 10 and 11 of the base and post respectively. The interior of the post is hollow, as at 12, and receives a bushing 13, the lower end of which is threaded through the base 7 and supporting plate 6, as at 14, and tightened to the fixed members by means of a nut 15. The lower surface of the post has a depression 16 in which is received a spring 17. This spring is fixed to the bushing 13 by means of a key 18 and rigidly connected to the post by the pin 19. The post and parts attached thereto are further maintained in upright position by means of a cap member 20 screwed to the base 7 and having an upper interior flange 21. An intermediate flange 22 formed around the post receives the ball bearings 23 which cooperate with the flange 21. This mechanism is protected by a covering piece 24 which fits over the cap 20.

The upper end of the bushing 13 is recessed, as at 25, and is lined with an insulating member 26. A conducting sleeve 27 is supported by means of its upper flanges 28 on the insulation and receives a carbon brush 29. In the upper portion of the hollow part 12 is tightly secured an insulating ring 30 in which is screwed a conductor 31 engaging the carbon brush 29. A spring 32 inserted in the sleeve 27 serves to maintain the brush in constant engagement with the member 31. A conductor 33 is inserted into a side of the post and is insulated therefrom by means of the sleeve 34. The outer end of the conductor 33 supports a single contact socket 35 and lamp 36 which are of the usual construction. The conductor 33 is placed in electrical communication with the member 31 by means of a brush 37 which rests on said contact and has its shank extending into and secured to the conductor 33. A conductor 38 passes through the bushing 13 and is joined to the lower portion of the sleeve 27, as at 39.

A cable 50, protected by a covering 52 passes through the covering 24 and cap 20 (Figures 4 and 6) and surrounds the post 8 beneath its intermediate flange 22. The outer end of the cable is secured to the post by means of a hook and eye 53, while the other end is connected to a suitable control device.

In the operation of the forward indicator, the spring 17 is normally under tension. When the cable 50 is slackened at the control device, the spring 17, which is now free to act, will tend to expand until it has taken up on the surface of the post 8 all of the loose cable. The spring being keyed to the post will turn the latter in the direction of the arrow shown in Figure 6 and will turn the lamp 36 therewith. For effecting a proper pointing medium in connection with the lamp, a cuff 54 is secured to the post in such a manner as to surround the lamp connections, and receives a translucent hand member 55, the wrist 55' of which fits into the cuff 54.

The wiring of the system will be understood from a consideration of Fig. 8 in which the numeral 71 indicates a socket at the rear end of the automobile. The terminals from each of the sockets 35 and 71 are connected to one another by a conductor 90, while the other terminals are grounded. The battery 91 is also grounded and connected to the conductor 90 between the sockets by means of a wire 92 in which is interposed a control switch 93. When this switch is opened, a current cannot flow from the battery through either or both sockets and the ground, but current is supplied to both signals when the switch is closed.

While a specific embodiment of the invention has been illustrated and described, it is to be understood that various alterations in the details of construction may be made without departing from the spirit of the invention as indicated by the appended claims.

Having thus fully described the invention, what I claim as new and desire to protect by Letters Patent is:—

1. A direction indicator comprising a base, a rotatable supporting element superposed on said base, said element having a longitudinal bore and a recess formed in its lower face, a bushing fitted in said bore, a spring within said recess and having its ends secured to said bushing and supporting element, said spring being normally under tension, a signal device carried by said supporting element, and means for retaining said element in adjusted positions against the action of the spring.

2. A direction indicator comprising a base, a supporting element rotatably mounted thereon, said element having a longitudinal bore and a recess in its lower end, a bushing fitted in said bore and secured to the base, a spring disposed in said recess and having its ends secured to the bushing and to the supporting element, said spring being normally under tension, means for locking the supporting element in adjusted positions against the action of the spring, a translucent pointer carried by said supporting element, and a lamp in the interior of said pointer.

3. A direction indicator comprising a base, a supporting element rotatably mounted thereon, said element having a longitudinal bore and a recess in its lower end, a bushing fitted in said bore and secured to the base, a spring disposed in said recess and having its ends secured to the bushing and to the supporting element, said spring being normally under tension, means for locking the supporting element in adjusted positions against the action of the spring, a translucent pointer carried by said supporting element, a lamp in the interior of said pointer, and a conductor passing through said bushing and to the lamp.

In witness whereof I have hereunto set my hand.

TOM BINGHAM.